United States Patent Office 3,225,120
Patented Dec. 21, 1965

3,225,120
THERMOPLASTIC COPOLYMER OF VINYL MONOMER AND SULFUR
William P. Baker, Jr., Chadds Ford, Pa., assignor to E. I. du Pont de Nemours and Company, Wilmington, Del., a corporation of Delaware
No Drawing. Filed May 16, 1962, Ser. No. 195,324
7 Claims. (Cl. 260—874)

This invention relates to novel polymers and, more particularly, to copolymers of sulfur-containing monomers with vinyl monomers, preferably with vinyl monomers having conjugated unsaturation, e.g., styrene, butadiene, acrylonitrile and the like.

By "sulfur-containing or sulfide monomers" are meant elemental sulfur and alkylene episulfides, the latter of the formula

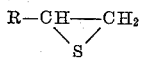

wherein R is hydrogen or lower alkyl (1–18 carbon atoms). Such compounds include ethylene sulfide, propylene episulfide, dodecylene episulfide, etc.

It has been found that by incorporating sulfur-containing monomers into such polymers as polystyrene and the like so that the combination is in the form of a block copolymer, a great number of the properties of the basic polymer can be substantially improved. Thus, where polystyrene is brittle and inflexible, the copolymer of styrene and sulfur-containing monomer is tough and flexible. It has also been found that the novel copolymers of the present invention are more easily cured by conventional curing treatments. Besides greater flexibility and toughness, these polymers display improved tear strengths, impact strengths and tensile strengths.

The novel copolymers are produced by first preparing a catalyst solution; adding the solution to a purified vessel; adding, preferably, if possible, by vacuum distillation, at least one prepurified vinyl monomer under such conditions that cause the vinyl monomer to polymerize; and, thereafter, adding the sulfur-containing monomer under such conditions that cause copolymerization of the sulfur-containing monomer with the polymer of the vinyl monomer, preferably to the extent that the sulfur-containing monomer represents 2–80 mole percent of the sum of moles of vinyl monomer and sulfur-containing monomer in the final copolymer.

VINYL MONOMERS

The preferred group of vinyl monomers for use in the present invention includes styrene, butadiene, isoprene, methyl methacrylate and acrylonitrile. However, the broad group includes esters of acrylic, methacrylic and other α-substituted acrylic acids, including esters of α-cyanoacrylic acid, acrylonitrile, methacrylonitrile and other α-substituted acrylonitriles, including vinylidene cyanide, styrene, ring-substituted styrenes, α-methylstyrene, ring-substituted α-methylstyrenes, vinyl pyridines and methylene malonates.

In general, these monomers should be free of such groups as hydroxy, hydroxycarbonyl, thiol, imino, primary or secondary amino, amido and the like, i.e., groups that contain an active hydrogen atom as determined by the Zerewitinoff test[1] carried out under the conditions employed for polymerization. The list of compounds includes, specifically, α-methylstyrene, p-methoxy-α-methylstyrene, p-methyl-α-methylstyrene, styrene, p-methylstyrene, p-chlorostyrene, 2,4-dimethylstyrene, m-ethylstyrene, m-isopropenylstyrene, or butadiene, isoprene, piperylene, or methyl, ethyl, propyl, isopropyl, butyl, isobutyl, sec-butyl, tert-butyl, amyl, 2-ethylhexyl, octyl, capryl, nonyl, 3,5,5-trimethylhexyl, dodecyl, hexadecyl, octadecyl, cyclohexyl, methylcyclohexyl, trimethylcyclohexyl, phenyl, methallyl, crotyl, butenyl, undecenyl, oleyl, methoxyethyl, ethylthioethyl, butoxyethyl, ethoxyethoxyethyl, phenoxyethyl, benzoethyl, cyclohexoxyethyl, butoxypropyl, ethoxybutyl, terphenyl, phenylethyl, hexahydrobenzyl, tetrahydrobenzyl, tetrahydrofurfuryl, dicyclopentyl, dicyclopentenyl, methacrylate or acrylate, or 2-, 3-, or 4-vinylpyridine, or acrylonitrile, methacrylonitrile, α-phenylacrylonitrile, or dimethyl methylenemalonate, diethyl methylenemalonate, vinylidene cyanide, or methyl, ethyl, or butyl α-cyanoacrylate.

SOLVENTS

Various solvents can be employed for the polymerizations. They include benzene, toluene, xylene, the naphthas, ethers, such as diethyl ether, diisopropyl ether, dioxane, tetrahydrofurane, the dimethyl ether of ethylene glycol, dimethylformamide and dimethylacetamide. The important considerations in selecting the solvent are: they should be inert; they should have some affinity for the polymer formed; and they should not contain in their structure any active hydrogen atoms as determined by the Zerewitinoff test carried out under the conditions employed for polymerization, or other groups which would have a tendency to act as chain terminating or transfer agents. That is, the same criterion regarding active hydrogen applied to the vinyl monomers should be applied to the solvents.

CATALYSTS

The catalyst systems operable in this process are broadly those which promote the formation of dicarbonions. That is, they are capable of transferring an electron to a polymerizable monomer to form a monomer ion, which adds more monomer units and then combines with another ionized monomer radical to yield a molecule having two negatively charged ends or sites (a dicarbonion) on each end of which further propagation can take place. Thus, the metals of Group IA (lithium, sodium, potassium) used either alone or as complexes with such polycyclic aromatic compounds as naphthalene, phenanthrene, diphenyl, dinaphthyl, acenaphthene, methylnaphthalene and retene are especially effective in promoting polymerizations of this type.

The amount of catalyst employed depends primarily on the monomers to be used and the characteristics desired in the final polymer produced. In general, an increased amount of catalyst leads to the production of a lower molecular weight product, and vice versa.

REACTION CONDITIONS

With respect to temperature at which these copolymerizations are carried out, temperatures as low as −100° C. and as high as 100° C. may be employed in carrying out the polymerization. Preferably, the reactions are carried out at a temperature of about −80° C. to +10° C. The precise temperature of polymerization will depend to a large degree upon the particular reactivities of the monomers being reacted. Stability of the intermediate car-

[1] As described in two articles by Zerewitinoff: Berichte, 40, 2023 (1907), and Berichte, 41, 2233 (1908); and in an article by Kohler in J. Am. Chem. Soc., 49, 3181 (1927).

bonion likewise is a consideration in selecting the best temperature for carrying out the reaction. The process is usually carried out under vacuum. For some systems, it may be desired to carry out the polymerizations at atmospheric pressure or above. In some instances an inert atmosphere such as argon may be used to advantage.

SULFUR-CONTAINING MONOMER

The sulfur-containing monomer is characterized by a sulfide linkage which is believed to link to the vinyl monomer to provide the following types of polymer:

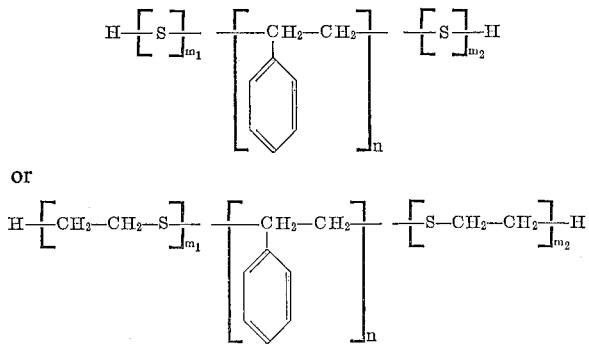

The monomer should be used in a very pure condition and should be added to the polymerization system after polymerization of the vinyl monomer has occurred to the extent of at least 10 units as represented by $n$ in the typical formulae. The amount of sulfide monomer used should be such that it represents at least 0.5 mole percent of total monomer in the copolymer as represented by $m_1$ and $m_2$ in the typical formulae. Below this amount, it has been found that the advantages of the present invention are not achieved. It should be understood that different minima will apply depending upon the vinyl monomer or vinyl monomers used. Although there is no real maximum, it has been found that when the sulfide monomer represents more than 80 mole percent of total monomer used, then the basic desirable properties of the polymer of the vinyl monomer are substantially lost. In some instances wherein properties more characteristic of the sulfur-containing polymer may be most desired, a higher proportion of the sulfur-containing monomer, for example up to 98 mole percent, may be incorporated.

As stated previously, the preferred copolymer is the block copolymer. Specifically, it is the block copolymer having at least one constituent incorporated singly as a central discrete segment, said constituent being a polymerized vinyl monomer (styrene, methyl methacrylate, acrylonitrile, isoprene, butadiene), said central segment having attached at each end at least one additional polymer segment of a polymerizable monomer devoid of carbon-to-carbon unsaturation (the sulfur-containing monomer). It should be understood that other polymer segments, e.g. vinyl or non-vinyl, may be attached to the segments of polymerized sulfur-containing monomer. The block copolymers are prepared by the action of an electron transfer agent of the group of metals and metallo-organic complexes of Group IA of the Periodic Table.

It should be understood that the novel copolymers of this invention are useful in the preparation of films, filaments, rods, tubing, moldings, foamed structures, nets, nonwoven fabrics and the like.

The films may be used for packaging or as laminates in the preparation of building materials or the like. The copolymers of the invention may be used as such. They may also contain dyes, fillers, pigments, plasticizers, etc.

The invention will be more fully understood by referring to the examples which follow.

Example 1

The apparatus for the polymerization consists of a vacuum train to which is attached the polymerization flask fitted with a glass covered magnetic stirring bar and tubes for admitting the catalyst solution, the solvent and the monomers. The equipment is so arranged that transfers of material to the reaction flask can be made through the closed system, out of contact with the exterior atmosphere. For convenience, the reaction system is operated under reduced pressure so that the liquid materials can be transferred by distillation. The catalyst solution is introduced from a dropping funnel fitted directly to the polymerization flask.

The reaction flask containing the stirrer is prepared for carrying out polymerization by first heating it in an oven at 140° C. overnight, then heating it in a flame under evacuation for three hours, then cooling it to —78° C. with a Dry Ice/acetone bath. There is then added 2 ml. of catalyst solution (about 0.001 molar of sodium biphenyl in prepurified tetrahydrofurane). After standing for 30 minutes, 300 ml. of tetrahydrofurane is distilled into the solution and stirring is started. The color of the liquid in the reaction flask at this stage is blue-green and it shows no loss of intensity on standing, indicating that no catalyst deactivation is occurring. An additional 4 ml. of catalyst solution is added. After 15 minutes, 6 ml. of styrene is added by distillation under vacuum over a 6-minute interval while the temperature is held at —80° C.

The styrene had been purified by washing with 10% sodium hydroxide and then with water, then drying over magnesium sulfate, then distilling under nitrogen onto calcium hydride, then degassing under vacuum three times. The styrene so treated is distilled under reduced pressure. A center cut is distilled onto calcium hydride and, prior to use in the polymerization, 10% of this center cut is distilled off and discarded prior to use. Immediately upon the addition of styrene, the solution, which is stirred continuously throughout the experiment by a glass encased magnetic stirrer, becomes viscous and turns orange.

After 17 minutes, 5 ml. of ethylene episulfide is distilled into the polymerization flask under vacuo over a 5-minute period. The ethylene episulfide, prior to introduction into the polymerization flask, had been dried on the vacuum line over calcium hydride and degassed five times. It had been distilled from the first portion of calcium hydride onto a second portion of calcium hydride under vacuum three times, a center cut being taken for distillation each time. After each distillation, the distillate had been degassed and just prior to use about 5% of a forerun is taken off and discarded.

Immediately upon addition of the ethylene episulfide, the solution turns colorless. The Dry Ice-acetone bath used to maintain the temperature at —78° C. is replaced by a water-ice bath. As the solution warms, a partial gel begins to form and finally after one and one-half hours immersion of the reaction flask in the water-ice bath the contents have gelled.

One milliliter of methanol is introduced into the reaction flask and the entire solution is then decanted into excess methanol in an Osterizer. The polymer which precipitated is then collected by filtration, washed with methanol in an Osterizer, recollected and dried.

A film is pressed from the precipitated polymer at 160° C. Film shows infrared absorption at 7.04, 8.4, 8.74, 13.85 and 14.95 microns characteristic of both polystyrene and polyethylene episulfide. A portion of the polymer is extracted with benzene, reprecipitated and dried. An infrared absorption spectra of films pressed from the extracted polymer show the same absorption pattern as before extraction, indicating the formation of a true copolymer. Elementary analysis shows carbon 80.00%; hydrogen 7.80%; sulfur 4.05%. The film pressed from the copolymer is considerably tougher and more flexible than a control polystyrene film.

Example 2

Following essentially the procedure of Example 1, there is introduced into the polymerization flask 2.5 ml. of a catalyst solution (0.001 molar sodium biphenyl in tetrahydrofurane) and 300 ml. of tetrahydrofurane. There is then introduced into the vessel 6.5 ml. of styrene over a 10-minute period. Fifteen minutes later, 8.2 ml. of propylene episulfide is added over a 5-minute period.

The propylene episulfide had been purified by distilling through a spinning band column onto calcium chloride. It had then been degassed and then distilled into the reaction flask under reduced pressure.

Rapid stirring is maintained throughout the polymerization reaction. The reaction mixture is allowed to stand for 20 minutes at −80° C. and is then allowed to warm up to −20° C. over a 30-minute interval. To stop the reaction, 0.25 ml. of degassed glacial acetic acid is introduced. After stirring the contents for a few minutes, the flask is opened under a nitrogen atmosphere, the reaction mixture is removed from the flask, decanted into 2.5 liters of methanol and the resulting precipitate is collected by filtration and dried.

The product is a white powder having an infrared spectrum showing absorption bands characteristic of both propylene episulfide and styrene. A portion of the material is pressed into a clear film at 160° C., at 30 tons pressure per square inch. The polymer shows an inherent viscosity of 2.87 (0.5 g. in 100 ml. benzene at 30° C.) corresponding to a molecular weight of approximately 900,000. Extraction of the polymer in benzene and reprecipitation shows no change in the infrared absorption spectra indicating that a true copolymer had been formed. Analysis of the sulfur content of the copolymer indicates approximately 3 mole percent of propylene episulfide in the copolymer. The film is tougher and more flexible than a control polystyrene film.

*Example 3*

Following the procedure described in Example 1, 3.5 ml. of catalyst (0.001 molar sodium biphenyl in tetrahydrofurane) and 300 ml. of tetrahydrofurane are introduced into the polymerization vessel. This mixture is cooled to −80° C. and, with stirring, there is then added 5 ml. of styrene over a 5-minute period followed by the addition of 10 ml. of purified propylene episulfide over a 10-minute period and 3 ml. of purified acrylonitrile over a 3-minute period. Following this, the flask is removed from the vacuum line and is opened under a nitrogen atmosphere and 0.25 ml. of glacial acetic acid is added. The cold solution is decanted into 2½ liters of methanol and the resulting precipitate is washed twice with methanol and is collected by filtration and dried.

The product is a powder from which a clear film is pressed at 150° C. The film is much more flexible than a control film of styrene-acrylonitrile copolymer. The infrared spectrum of the product shows absorption bands characteristic of styrene, acrylonitrile and episulfide. The product is readily soluble in dimethylformamide and could be cast into films from this solvent. Reprecipitation of the polymeric material from dimethylformamide produces no change in the infrared absorption spectrum showing that a true terpolymer has been formed. Elementary analysis indicates that the product contains 56% styrene, 39% acrylonitrile and 5% propylene episulfide.

*Example 4*

Following the procedure of Example 1, 13 ml. of catalyst solution (.001 molar sodium biphenyl in tetrahydrofurane) is introduced into the reaction flask prepared as described previously, and maintained at −78° C. There is then introduced 300 ml. of tetrahydrofurane. Next, 5.5 ml. of styrene is introduced over a 5-minute period. A vial containing 2 grams of sulfur is then dropped into the reaction mixture. The vial is broken by the action of the stirrer and immediately the solution turns yellow and solid material is observed in the reaction mixture. After one hour there is no change and 1.5 ml. of styrene is added without any observable effect. One-half hour later, 0.05 gram of iodine in 3 ml. of tetrahydrofurane is added. The color of the solution becomes somewhat lighter. The flask is then opened and film is cast from the cold mixture. The rest of the mixture is decanted into 2 liters of methanol with stirring and the resulting precipitate is collected by filtration and dried. The yield of product is 6.3 grams. An infrared spectrum of the film cast from the cold solution is essentially that normally shown by polystyrene but there is a new band in the 13.3 micron region. Elementary analysis of the polymeric product shows 71.08% carbon; 6.06% hydrogen; 22.86% sulfur. Inherent viscosity of the product is 1.13 measured as a 0.5% solids solution in benzene at 30° C.

By way of comparison, a 3/1 polystyrene to sulfur mixture by weight is prepared by grinding the two components in a mortar. Pressing this mixture at 160° C. causes sulfur to melt and flow out of the film. By contrast, a film pressed from the polymer precipitated from methanol as described above shows no evidence of sulfur flowing from it during pressing under the same conditions. A sample of the latter film could be stretched 2× by 2× at 165° C. to provide a film that is tougher than a control polystyrene film.

*Examples 5–7*

These examples are carried out substantially as described in Example 1 using the relative molar amounts of vinyl monomer and sulfur-containing monomer shown in the table. The copolymer products are pressed into films and their properties are given in the table.

TABLE

| Example | Mole Percent Vinyl Monomer | Mole Percent Sulfur-Containing Monomer | Film Property |
| --- | --- | --- | --- |
| 5 | 85 Butadiene | 15 Propylene Episulfide. | Higher tenacity and stiffer film than butadiene polymer control film. |
| 6 | 85 Acrylonitrile | 15 Dodecylene Episulfide. | Tough, flexible film. |
| 7 | 85 Isoprene | 15 Ethylene Episulfide. | Higher tenacity and stiffer film than isoprene polymer control film. |

Having fully disclosed the invention, what is claimed is:

1. A normally solid thermoplastic copolymer having at least one constituent incorporated singly as a non-recurring central discrete segment, said constituent being a polymerized vinyl monomer, said central segment being composed of at least 10 units of said vinyl monomer and having attached at each end at least one additional polymer segment of elemental sulfur monomer, said vinyl monomer being devoid of groups containing an active hydrogen atom as determined by the Zerewitinoff test, and said elemental sulfur monomer constituting 0.5–98% of the sum of the moles of said copolymer.

2. A copolymer as in claim 1 wherein said vinyl monomer is styrene.

3. A copolymer as in claim 1 wherein said vinyl monomer is butadiene.

4. A copolymer as in claim 1 wherein said vinyl monomer is isoprene.

5. A copolymer as in claim 1 wherein said vinyl monomer is methyl methacrylate.

6. A copolymer as in claim 1 wherein said vinyl monomer is acrylonitrile.

7. A self-supporting film comprising a normally solid thermoplastic copolymer having at least one constituent incorporated singly as a non-recurring central discrete segment, said constituent being a polymerized vinyl monomer, said central segment being composed of at least 10 units of said vinyl monomer and having attached at each end at least one additional polymer segment of elemental sulfur monomer, said vinyl monomer being devoid of groups containing an active hydrogen atom as determined by the Zerewitinoff test, and said elemental sulfur monomer constituting 0.5–98% of the sum of the moles of said copolymer.

References Cited by the Examiner

UNITED STATES PATENTS

| | | | |
|---|---|---|---|
| 2,136,928 | 11/1938 | Schlack | 260—2 |
| 3,050,511 | 8/1962 | Szwarc | 260—93.5 |
| 3,070,579 | 12/1962 | Szwarc | 260—79 |
| 3,113,165 | 12/1963 | Bloch | 260—94.9 |

JOSEPH L. SCHOFER, *Primary Examiner.*